United States Patent [19]

Yamaguchi et al.

[11] Patent Number: 4,528,251
[45] Date of Patent: Jul. 9, 1985

[54] DIFFERENTIAL-PRESSURE CONTROL DEVICE FOR A FUEL CELL

[75] Inventors: Masanori Yamaguchi; Yasuyuki Tsutsumi; Shunsuke Nogita; Kazunari Shimada, all of Hitachi; Saburo Maruko, Yamato, all of Japan

[73] Assignees: Hitachi, Ltd.; Nippon Chemical Plant Consultant Co., Ltd., both of Tokyo, Japan

[21] Appl. No.: 631,245

[22] Filed: Jul. 16, 1984

[30] Foreign Application Priority Data

Jul. 18, 1983 [JP] Japan .................. 58-129415

[51] Int. Cl.³ .............................................. H01M 8/04
[52] U.S. Cl. ........................................ 429/25; 429/22
[58] Field of Search ................................ 429/25, 22

[56] References Cited

U.S. PATENT DOCUMENTS 4,075,396 2/1978 Grehier ........................ 429/25 X
4,226,919 10/1980 Strüve .............................. 429/25

Primary Examiner—Charles F. Le Fevour
Attorney, Agent, or Firm—Antonelli, Terry & Wands

[57] ABSTRACT

A differential-pressure control device for fuel cell comprises three liquid tubs allowed to communicate with each other at their respective bottom portions through a sealing liquid having free surfaces, gas pipe means which connect the liquid tubs to gas outlets of the fuel cell respectively to introduce the gas flows from an anode, a cathode and a cell container of the fuel cell into the sealing liquid of the liquid tubs, each of the gas pipe means being formed with gas blow out section opened in the sealing liquid at the end portion thereof, the gas blow out sections having relative heights set at the value corresponding to predetermined differential pressure among the electrodes and the cell container, and gas conduit means for guiding the gas to the outside of the device from the gas chambers defined by the liquid tubs and the free surfaces of the sealing liquid respectively and located at the tops of the liquid tubs respectively. The differential-pressure control device has no mechanical movable part and makes it possible to always keep the differential pressure at a constant and, at the same time, to absorb the transient small variations in pressure of the electrodes.

4 Claims, 7 Drawing Figures

DIFFERENTIAL-PRESSURE CONTROL DEVICE FOR A FUEL CELL

BACKGROUND OF THE INVENTION

The present invention relates to a fuel cell and, more particularly, to a differential-pressure control device for a fuel cell which is arranged to effect control of the differential pressure between electrodes of the fuel cell.

The differential pressure between electrodes of a fuel cell has hitherto been controlled by adjustment of the valves shown in FIG. 1. In FIG. 1, the reference numeral 1 denotes an anode of a fuel cell, the reference numeral 2 a cathode, and the reference numeral 3 a cell container. The flow rates of gases allowed to flow into the electrodes 1, 2 and cell container 3 are respectively controlled, in response to the variation in load of the cell, by flow control valves 4, 5 and 6 provided at the side of gas inlet. The difference in pressure between the anode 1 and cathode 2 is detected by a differential pressure gauge 7 and is controlled by driving a differential pressure control valve 8 with the use of a deviation between the value of detection and a predetermined set value.

Similarly, the difference in pressure between the cathode 2 and the cell container 3 is controlled by means of a differential pressure control valve 10, and the pressure of the cell container 3 is maintained to be constant by a pressure control valve 12. The gases which have passed through the differential pressure control valves 8, 10 and 12 respectively, join each other at the downstream side of an external heat portion 13 of a fuel improvement device for fuel cell. Since this manner of controlling the differential pressure between the electrodes of the fuel cell uses the valves having movable parts, it has drawbacks. So countermeasures are required to be taken against a defective operation due to deterioration of such movable parts with the lapse of time, a non-uniform operation due to the variation in characteristic of the valves, and a possible danger which arises from the use of combustible gas due to the use of electric signals.

Further, since the above-mentioned manner of controlling the differential pressure between the electrodes of the fuel cell uses the valves having the movable parts, it is limited in respect of the control performance, i.e., it poses the problem that its control system cannot sufficiently respond to the small and transient variations in pressure of the inflow gas.

Solutions to the latter problem are disclosed in Japanese Pat. "Kokai" No. 164159/83 and Japanese Pat. "Kokai" No. 165269/83. What is disclosed in Japanese Pat. "Kokai" No. 164159/83 is a device prepared by connecting a means comprised of a tank and a water seal equipment in parallel to a fuel gas supply pipe line. This device is arranged such that, when the pressure of the fuel gas is minutely varied, the liquid level of the water seal equipment rises or falls in accordance with the pressure variation. The volume of a fuel gas pipe line increases or decreases due to the rise or fall of the liquid level in accordance with the pressure variation, whereby this transient variation in pressure is absorbed.

The device disclosed in Japanese Pat. "Kokai" No. 165269/83 includes the first and the second sealing means, each of which is arranged to seal a communication passage between two gas chambers communicated with each other at their bottom regions with a sealing liquid having a free surface, and one of gas chambers of the first sealing means and one of gas chambers of the second sealing means are respectively connected in parallel to a fuel gas line and an air line of the inlet side of the fuel cell and the other gas chambers of the first and the second sealing means are connected to an inert gas line of which pressure is set at a predetermined pressure level. In this device, when the pressure of the fuel gas or air varies transiently, the liquid level of the liquid sealing means varies in accordance with the variation in the differential pressure between the inert gas, which serves as a reference pressure, and the fuel gas or air, whereby the gas occupied volume of the gas chamber is increased or decreased so as to absorb the transient small variation in pressure.

The above-mentioned two devices are each intended to absorb the above-mentioned transient small variation in pressure of the fuel gas or air but, in each device, the continuous differential pressure between the electrodes of the cell must be controlled by the differential pressure control valves. Therefore, the above-mentioned drawbacks still remain.

SUMMARY OF THE INVENTION

The present invention has been accomplished in view of the above-mentioned circumstances and the object thereof is to provide, in place of a device for controlling the differential pressure between cell electrodes by a valve operation as in the prior art, a differential-pressure control device for a fuel cell which has no mechanical movable portion and which, when the variation in pressure occurs in one cell electrode, automatically causes a variation in pressure of the other cell electrode so as to keep the differential pressure between the cell electrodes at all times to be at a predetermined level, and which is capable of absorbing a transient small variation in pressure of the gas involved.

The principle of the present invention will now be described with reference to FIG. 2.

The flow rates of the fuel gases allowed to flow into the anode and cathode of a fuel cell are controlled by flow rate control valves in accordance with the load of the fuel cell. That is to say, where the load of the fuel cell is increased, the control is made so that the flow rates of the fuel gases may be increased. Where, on the other hand, such load is decreased, the control is made so that such flow rates may be decreased.

The gas from the anode passes through a gas pipe means 14 and thus is blown from a blow out section 15 into a liquid tub 16. On the other hand, the gas from the cathode passes through a gas pipe means 17 and thus is blown from a blow out section 18 into a liquid tub 19. Both the liquid tubs 16 and 19 are allowed to communicate with each other by means of a communication section 20.

When the pressures applied to the liquid levels of the liquid tubs 16 and 19 are represented by P1 and P2, respectively, the pressure $P_A$ applied to the anode and the pressure $P_K$ applied to the cathode can be expressed as follows.

$$P_A = P1 + \rho g h1 \tag{1}$$

$$P_B = P2 + \rho g h2 \tag{2}$$

On the other hand, the following formula is established from the nature of the communication pipe.

$$P2 + \rho g h2 = P1 + \rho g(h1 + \Delta h) \tag{3}$$

As a result, the differential pressure between the anode and cathode, which is represented by $\Delta P_{AK}$, can be written as follows.

$$\Delta P_{AK} = \rho g \Delta h \quad (4)$$

Assume now that the flow rate of the gas from the anode is increased by the flow rate control valve involved. Generally, the line resistance to the gas flowing through a pipe line involved increases in proportion to the square of the flow rate thereof. Upon the increase in flow rate of the gas from the anode, therefore, the pressure P1 in the gas chamber increases up to a level P1′ due to the increase in the line resistance of a pipe or conduit means (not shown) connected to the gas chamber located at the top of the liquid tub 16. As a result, the liquid level of the liquid tub 16 is lowered, whereby h1 changes to h1′. Simultaneously, the liquid level of the liquid tub 19 rises, whereby h2 changes to h2′. Consequently, when the pressures applied to the anode and cathode are represented by $P_A'$ and $P_K'$, respectively, the following formula is obtained.

$$P_A' = P1' + \rho g h1' \quad (5)$$

$$P_K' = P2 + \rho g h2' \quad (6)$$

From the nature of the communication pipe, the following formula is obtained.

$$P2 + \rho g h2' = P1' + \rho g (h1' + \Delta h) \quad (7)$$

To determine the differential pressure $\Delta P_{AK}'$ between the anode and cathode, $$\Delta P_{AK}' = P2 + \rho g h2' - (P1' + \rho g h1') = \rho g \Delta h \quad (8)$$

When the formulae (4) and (8) are compared with each other, it is found that the following formula holds true.

$$\Delta P_{AK} = \Delta P_{AK}'$$

That is to say, even when the flow rate of the gas from the anode increases and the pressure applied to the anode thus increases, the pressure applied to the cathode is also automatically increased by communicating the liquid tubs 16 and 19 with each other, whereby the differential pressure between the anode and cathode is at all times kept to be constant.

Same applies where the flow rate of the gas from the anode decreases and where the flow rate of the gas from the cathode increases or decreases. In other words, only if the difference in height between the gas blow out sections respectively communicated with the anode and the cathode is set at a value corresponding to a predetermined differential pressure between the anode and the cathode, it is possible, even when any variation in pressure occurs in the electrode, to absorb this variation in pressure, thereby automatically to maintain said differential pressure to be constant at all times.

The principle of the present invention is based on the utilization of the said movement of liquid in the communication pipe.

DETAILED DESCRIPTION OF THE PREFERRED EMBODIMENT

Figure 3:
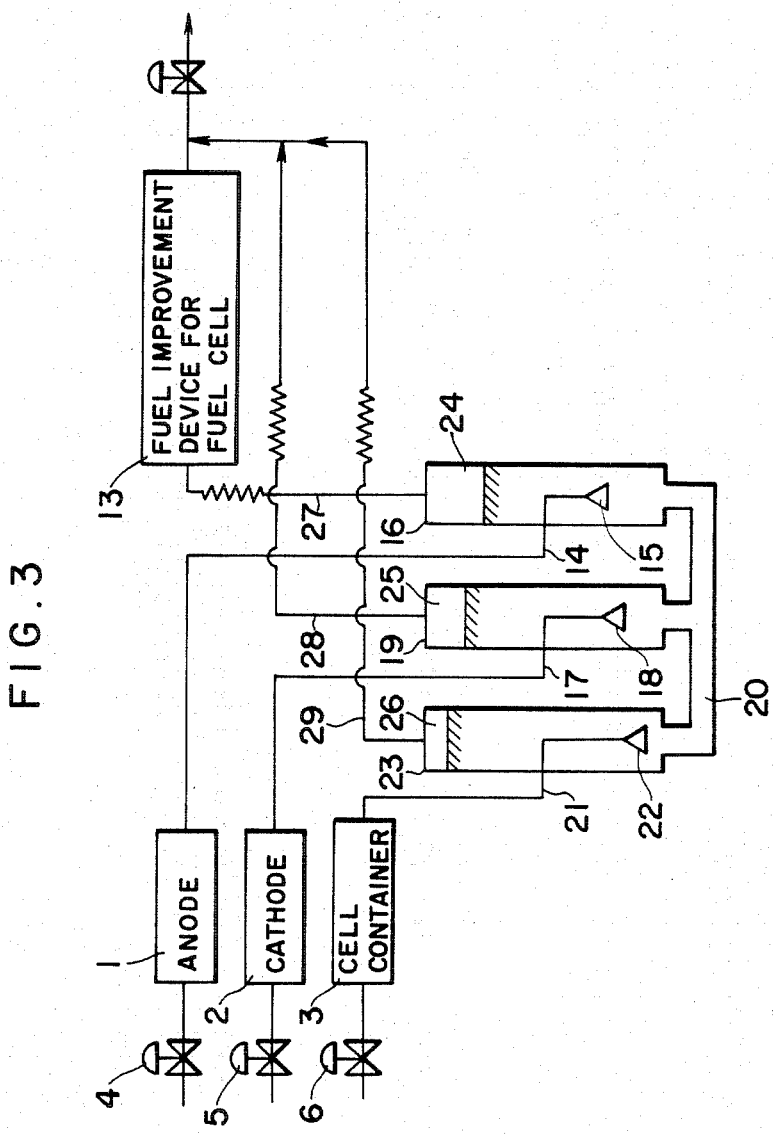
FIG. 3 is a block diagram showing the construction of a differential-pressure control device according to an embodiment of the present invention.

An embodiment of the present invention will now be described with reference to FIG. 3.

The reference numeral 1 denotes an anode of a fuel cell, the reference numeral 2 a cathode, and the reference numeral 3 a fuel cell container. Flow rate control valves 4, 5 and 6 for controlling the flow rates of gases being supplied to the anode 1, cathode 2 and cell container 3 are provided in the gas supplying pipe lines to supply the gas into these cell elements, respectively. A gas outlet of the anode 1 is connected to a liquid tub 16 through a gas pipe means 14. Similarly, respective gas outlets of the cathode 2 and cell container 3 are connected to liquid tubs 19 and 23 through gas pipe means 17 and 21, respectively. The liquid tubs 16, 19 and 23 are allowed to communicate at their respective bottom portions with each other by means of a communication pipe means 20 and a sealing liquid having a free surface is sealed in those tubs. The gas pipe means 14, 17 and 21 are formed with gas blow out sections 15, 18 and 22, at the end portions of the liquid tub side respectively, which are located within the sealing liquids of the liquid tubs 16, 19 and 23. These gas blow out sections are positioned so as to have the relative levels corresponding to the predetermined differential-pressures among the anode, the cathode and the cell container of the fuel cell. At the top of each liquid tub, a gas chamber 24, 25 or 26 defined by the free surface of the sealing liquid and the wall of the liquid tub is provided. The gas chambers 24, 25 and 26 are connected, by means of conduit, means 27, 28 and 29, to a fuel improvement device for fuel cell at the downstream side thereof, respectively.

The action of the differential-pressure control device for fuel cell having the above-mentioned construction will now be described. The gas flows from the anode 1, cathode 2 and cell container 3 are blown into the liquid tubs 16, 19 and 23 through the gas blow out sections 15, 18 and 22, respectively, and then led outside from the gas chambers 24, 25 and 26 through the pipe line means 27, 28 and 29, respectively. Assume now that the flow rate of the gas from the anode 1 has been increased or decreased by the operation of the flow control valve 4. Then, the pressure of the gas chamber 24 is increased or decreased by the line resistance of the pipe line means 27. As a result, the liquid level within the liquid tub 16 is allowed to rise or fall, whereby the pressure applied to the anode 1 is increased or decreased. On the other hand, since the liquid tubs 19 and 23 are respectively communicated with the liquid tub 16 through the communication pipe means 20, the liquid levels of the liquid tubs 19 and 23 are respectively allowed to fall or rise. As a result, the gas pressures of the cathode 2 and the cell container 3 are respectively increased or decreased. Thus, the differential pressures among the electrodes and cell container are maintained at a respective predetermined values constant in accordance with the above-mentioned principle of the present invention.

The explanation will now be made of which states the modifications of the gas blow out section of the above-mentioned differential pressure control device which has been proposed for the purpose of absorbing a transient variation in gas pressure.

Figure 1:
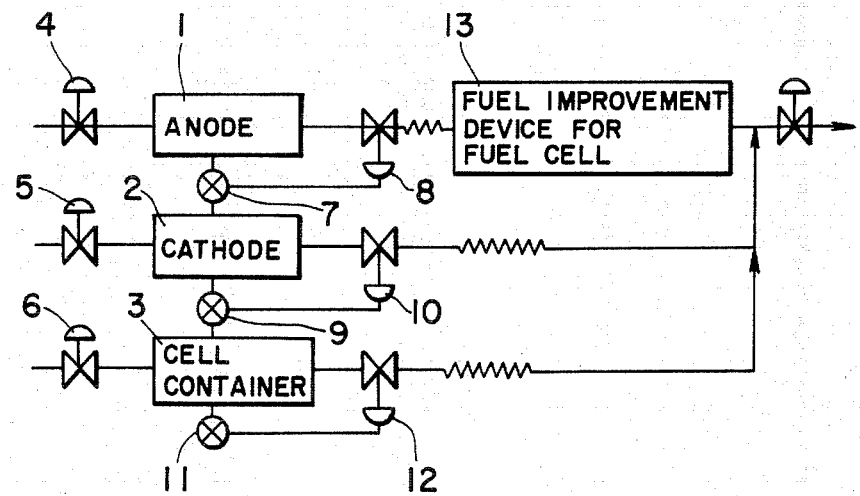
FIG. 1 is a block diagram showing the construction of a main part of a prior art differential-pressure control device for fuel cell.
Figure 2:
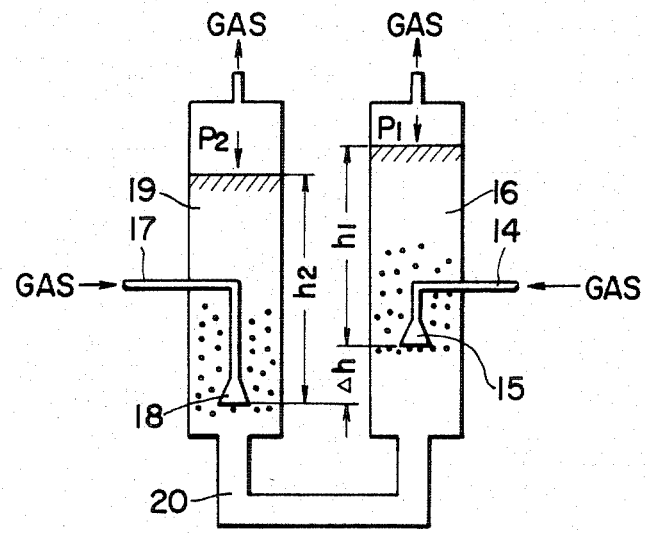
FIG. 2 is a view for explaining the principle of the present invention.
Figure 4:
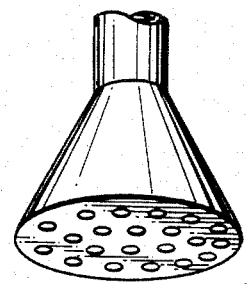
FIG. 4 is a view showing the structure of a gas blow out section of the differential-pressure control device.
Figure 5:
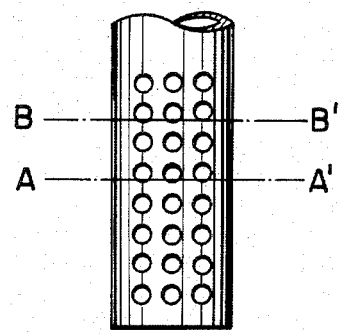
FIGS. 5 to 7 are views showing modifications of the structure of the gas blow out section, respectively.

The gas blow out section employed in FIG. 2 has a structure wherein, as shown in FIG. 4, a large number of small apertures are formed at the tip end of a conical blow out reaction and, from these apertures, the gas is blown out. This structure has the following drawbacks. That is to say, with this structure, it is possible that when the flow rate of one electrode is small and the pressure of the electrode is transiently lowered, the liquid in the liquid tub flows back into the interior of the conical blow out reaction, whereby the gas transiently ceases to be blown out therefrom. When, thereafter, the internal pressure of the liquid tub increases, the gas again starts to be blown out. Namely, in this structure, what is called "intermittent gas flow" takes place and the operation becomes unstable. The structures shown in FIGS. 5 and 6 can be considered as a structure for maintaining a continuous gas flow against the variation in gas pressure of the interior of the electrode. In the structure shown in FIG. 5, the blow out section is not shaped like a cone but shaped like a gas cylinder having a predetermined diameter, and is formed with a large number of small apertures at the outer surface. Assume now that when the device is in normal operation, the gas is blown out from a surface portion of the cylinder located on and above a specified level A—A'. When the pressure of the electrode connected to the blow out section is lowered, the level of lower limit at which the gas is blown out rises from the level A—A' to the level B—B'. The effect of this structure is as follows. First of all, the amount of the gas blown out from the gas blow out section decreases due to a rise of the lower limit level. Secondly, a reduction in volume of the gas pipe means whose volume is determined by the position of the lower limit level can contribute to rise the lowered pressure of the electrode. And thirdly, in this pressure variation process, no intermittence occurs in the gas flow. Namely, a continuous gas flow is obtained, whereby the device operation is stabilized. The FIG. 6 shows the structure of which the diameters of the apertures formed at the surface of the blow out section become larger toward the lower end thereof in order to make the effect of the FIG. 5 more effective.

Figure 6:
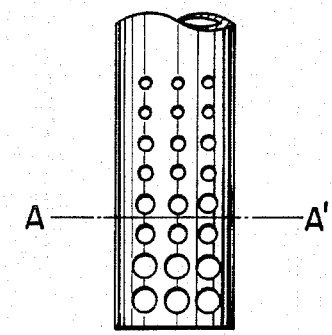
Figure 7:
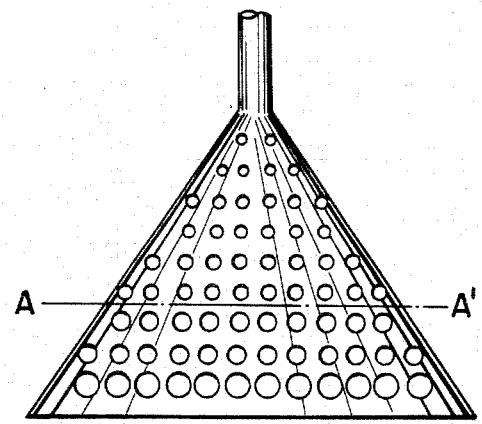

According to the structure shown in FIG. 6, as the lower limit level rises upwards, the amount of gas blown out rapidly decreases. For this reason, the amount of variation in the level A—A' becomes smaller than that of FIG. 5, so that the precision of the control of the differential pressure between the electrodes is increased. The structure shown in FIG. 7 is intended to further enhance the effect of the structure shown in FIG. 6. In this structure, the blow out section is made to a conical shape shown in FIG. 4 and the apertures are formed at the side surface of the cone and their diameter is made larger toward the lower end of the blow out section. In this structure, not only the amount of the gas blown out but also the volume of the gas pipe means is rapidly varied. Therefore, the amount of movement of the lower limit level becomes smaller than the case of FIG. 6, whereby the precision of controlling the differential pressure between the cell electrodes is increased and, at the same time, it is possible to prevent the blown gas from being concentrated onto the surface of the blow out section. Further, it is also possible to absorb the transient variation, as well, in gas pressure of the electrodes.

In the above-mentioned embodiment, the gas from the cell container was introduced into the exclusive liquid tub 23. However, where a strict control is not required to be made of the variation in gas pressure of the cell container, it is possible to arrange the invention such that the gas from the cell container 3 is allowed to join into the gas from the cathode 2, thereby to omit the use of the exclusive liquid tub 23 for the cell container.

Further, the gas supplied from the cathode 2 may be connected to the fuel improvement device 13 for fuel cell by way of the gas chamber 25.

According to the present invention, since it is possible to keep the differential pressure between the electrodes at a constant without using any mechanical movable parts and, at the same time, absorb the transient variations in pressure of the electrodes, it is unnecessary to take any countermeasures against the nonuniformity in characteristic of each control valve, the possible danger arising from the use of a combustible gas, etc. as in the prior art.

We claim:

1. A differential-pressure control device for fuel cell comprising:
   three liquid tubs allowed to communicate with each other at their respective bottom portions through a sealing liquid having free surfaces;
   gas pipe means which connect said liquid tubs to gas outlets of the fuel cell respectively to introduce the gas flows from an anode, a cathode and a cell container of the fuel cell into said sealing liquid of said liquid tubs, each of said gas pipe means being formed with a gas blow out section opened in said sealing liquid at the end portion thereof, said gas blow out sections having relative heights set at the values corresponding to predetermined differential pressures among said electrodes and said cell container; and
   conduit means for guiding the gas to the outside of the device from the gas chambers defined by said liquid tubs and said free surfaces of said sealing liquid respectively and located at the tops of said liquid tubs respectively.

2. A differential-pressure control device according to claim 1, wherein said gas blow out sections are formed with gas blow out apertures at their side surfaces.

3. A differential-pressure control device according to claim 2, wherein the diameters of said gas blow out apertures are made larger toward the lower end of the gas blow out section.

4. A differential-pressure control device according to claim 3, wherein said gas blow out section is made conical and the diameters of said gas blow out apertures formed at the side surface of said gas blow out section are made larger toward the lower end thereof.

* * * * *